(12) United States Patent
Nakamura

(10) Patent No.: US 7,714,523 B2
(45) Date of Patent: May 11, 2010

(54) LOAD DRIVING METHOD

(75) Inventor: Kouji Nakamura, Toyohashi (JP)

(73) Assignee: DENSO CORPORATION, Kariya (JP)

( * ) Notice: Subject to any disclaimer, the term of this patent is extended or adjusted under 35 U.S.C. 154(b) by 254 days.

(21) Appl. No.: 12/000,798

(22) Filed: Dec. 18, 2007

(65) Prior Publication Data

US 2008/0218103 A1 Sep. 11, 2008

(30) Foreign Application Priority Data

Mar. 7, 2007 (JP) ............................. 2007-057168
Aug. 31, 2007 (JP) ............................. 2007-226171

(51) Int. Cl.
*H02P 1/54* (2006.01)

(52) U.S. Cl. .................. 318/53; 318/811; 318/599; 363/39

(58) Field of Classification Search ................. 318/811, 318/599, 53, 66, 98, 102; 363/21.1, 21.18, 363/79, 39
See application file for complete search history.

(56) References Cited

U.S. PATENT DOCUMENTS

| | | | | |
|---|---|---|---|---|
| 4,464,615 A | * | 8/1984 | Rodi | ............................ 318/625 |
| 5,218,520 A | * | 6/1993 | Rozman et al. | ................ 363/39 |
| 5,232,052 A | | 8/1993 | Arvidson et al. | |
| 5,313,548 A | | 5/1994 | Arvidson et al. | |
| 5,988,307 A | * | 11/1999 | Yamada et al. | ................ 180/243 |
| 6,556,460 B2 | * | 4/2003 | Ishida et al. | ................... 363/39 |
| 6,891,342 B2 | | 5/2005 | Nakamura et al. | |

FOREIGN PATENT DOCUMENTS

| | | |
|---|---|---|
| JP | U-03-117393 | 12/1991 |
| JP | A-06-014557 | 1/1994 |
| JP | A-06-030594 | 2/1994 |
| JP | 06-165307 A | 6/1994 |
| JP | 06-189593 A | 7/1994 |
| JP | 07-051396 A | 2/1995 |
| JP | A-07-111796 | 4/1995 |
| JP | 09-331696 A | 12/1997 |
| JP | 10-146098 A | 5/1998 |
| JP | 2002-043910 A | 2/2002 |
| JP | 2004-072977 A | 3/2004 |

OTHER PUBLICATIONS

Office Action dated Jan. 13, 2009 in corresponding JP application No. 2007-226171 (and English Translation).
Office Action dated Nov. 18, 2009 from the German Patent and Trademark Office in the corresponding patent application no. 10 2007 055 837.8-32 (English translation enclosed).

\* cited by examiner

*Primary Examiner*—Rina I Duda
(74) *Attorney, Agent, or Firm*—Posz Law Group, PLC

(57) ABSTRACT

A load driving device controls two motors by PWM signals. When a standard duty ratio of the PWM signals is 50% and a level of a drive instruction is the standard duty ratio, the standard duty ratio are output to the respective motors to provide a reverse phase relationship that the PWM signal of the standard duty ratio does not overlap. A continuous off-period and the standard PWM signal output when the level of the drive instruction is lower than the standard, and the continuous on-period and the standard PWM signal output when the level of the drive instruction is higher than the standard are changed over at the ratios corresponding to the level of the drive instruction.

38 Claims, 9 Drawing Sheets

FIG. 2

| CIRCUIT 9 OUTPUT | V(IN) < V(B)/2 | V(IN) = V(B)/2 | V(IN) > V(B)/2 |
|---|---|---|---|
| 3A (Tr1) | (waveform) | (waveform) | (waveform) |
| 3B (Tr2) | (waveform) t1, t2 | (waveform) | (waveform) t3, t1 |
| CONTROL CONDITION | $V(IN) = \frac{t1}{t1+t2} \times \frac{V(B)}{2}$<br>$t3 = 0$ | $t2 = t3 = 0$ | $V(IN) = \frac{1}{t1+t3} \times \left(t3 + \frac{t1}{2}\right) \times V(B)$<br>$t2 = 0$ |

FIG. 8

| CIRCUIT 9 OUTPUT | V(IN) < V(B)/3 | V(IN) = V(B)/3 | V(IN) > V(B)/3 |
|---|---|---|---|
| 3A(Tr1) | | | |
| 3B(Tr2) | | | |
| CONTROL CONDITION | $V(IN) = \frac{t1}{t1+t2} \times \frac{V(B)}{3}$<br>$t3=0$ | $t2=t3=0$ | $V(IN) = \frac{1}{t1+t3} \times \left(t3 + \frac{t1}{3}\right) \times V(B)$<br>$t2=0$ |

LOAD DRIVING METHOD

CROSS REFERENCE TO RELATED APPLICATION

This application is based on and incorporates herein by reference Japanese Patent Applications No. 2007-57168 filed on Mar. 7, 2007 and No. 2007-226171 filed on Aug. 31, 2007.

FIELD OF THE INVENTION

The present invention relates to a load driving method, which drives plural electric loads that are connected to a power source by pulse-width modulation (PWM) control independently.

BACKGROUND OF THE INVENTION

In the case where PWM signals are supplied to electric loads such as two electric motors, a high frequency ripple becomes large when energization periods for the loads overlap with each other.

For solving this problem, for example, as disclosed in JP 6-189593A or IP 2002-43910A, two PMW signals are so output as to have a relationship of reverse phase so that the energization periods of those two loads do not overlap with each other. However, the ripple of a supply current can be suppressed only when the duty ratio of the PWM signal is 50%. For example, when a supply voltage is 12 V, only the voltage of 6V that is ½ of the full supply voltage (12 V) can be applied to the respective loads. Accordingly, the drive control range of the loads is limited.

SUMMARY OF THE INVENTION

The present invention therefore has an object to provide a load driving method, which is capable of expanding a load drive control range due to the PWM signal while suppressing the ripple of the supply current.

In a load driving method according to the present invention, a plurality of loads connected to a power source is driven by a drive signal independently. A standard duty ratio of a PWM signal used in driving the plurality of loads is set to be within a range of 100/n % or lower, wherein n is the number of the loads. The drive signal includes only the PWM signal of the standard duty ratio and output at a phase where energization times of the respective loads do not overlap with each other, when a level of a drive instruction of the loads corresponds to the standard duty ratio indicative of standard PWM signal. The drive signal includes the PWM signal and the continuous non-energization period and changes over the continuous non-energization period and the standard PWM signal at a ratio corresponding to the level of the drive instruction for outputting, when the level of the drive instruction of the loads is lower than the standard duty ratio. The drive signal includes the PWM signal and a continuous energization period and changes over the continuous energization period and the standard PWM signal at a ratio corresponding to a level of the drive instruction for outputting, when the level of the drive instruction of the loads is higher than the standard duty ratio.

BRIEF DESCRIPTION OF THE DRAWINGS

The above and other objects, features and advantages of the present invention will become more apparent from the following detailed description made with reference to the accompanying drawings. In the drawings:

FIG. 2 is a table showing drive signals that are output by a processing circuit according to a level of an instruction voltage;

FIG. 8 is a table showing drive signals that are output by a processing circuit according to a third embodiment of the present invention;

DETAILED DESCRIPTION OF THE PREFERRED EMBODIMENTS

First Embodiment

Figure 1:
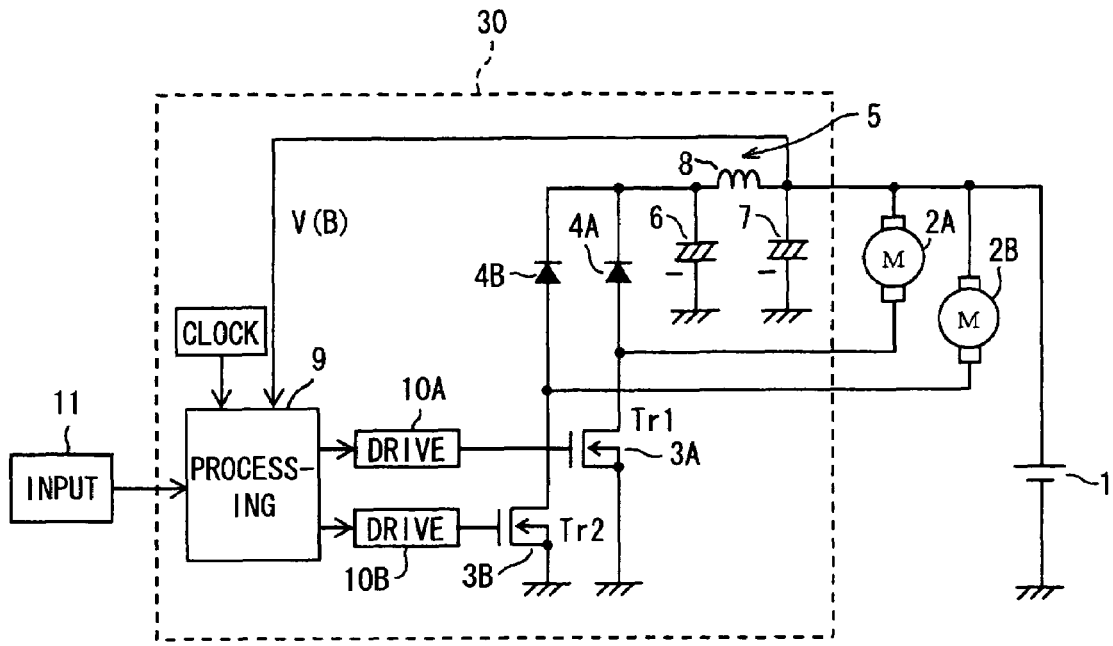
FIG. 1 is a circuit diagram showing a load driving device according to a first embodiment of the present invention.

A load driving device 30 according to a first embodiment is directed to a device for driving a cooling fan that cools a radiator of a vehicle engine and a condenser of an air conditioner. A series circuit of a motor (load) 2A and an n-channel MOSFET 3A (switching element Tr1) and a series circuit of a motor 2B and an n-channel MOSFET 3B (switching element Tr2) are connected in parallel between a battery (power source) 1 of the vehicle and the ground. The drains of FETs 3A and 3B are connected to the battery 1 through diodes 4A and 4B of a forward direction and a n-type filter 5.

The diodes 4A and 4B regenerates a delay current that flows when the FETs 3A and 3B change over from the on-state to the off-state to the battery 1. The n-type filter 5 is made up of capacitors 6, 7 and a coil 8, and absorbs the regenerative current and smoothes the power source.

A PWM control signal that is output by an arithmetic processing circuit (control means) 9 is output to the gates of the FETs 3A and 3B through drive circuits 10A and 10B. When the FET 3 turns on, a current flows from the battery 1 through a route of the motor 2, the FET 3, and the ground to energize the motor 2. Then, when the FET 3 turns off, a delay current is regenerated to the battery 1 side through the diode 4 and the n-type filter 5. In this situation, the regenerative current is smoothed by the capacitor 6 of the n-type filter 5. The capacitor 7 at the reverse side is disposed for smoothing the power source voltage of the battery 1.

An input circuit 11 is an electronic control unit (ECU) that outputs a drive instruction of the cooling fan motor 2 not shown, and outputs the drive instruction to the processing circuit 9 according to the PWM signal of a relatively low speed. The processing circuit 9 converts (duty/voltage conversion) so as to generate an instruction voltage V (IN) according to the duty ratio of the PWM signal, compares the instruction voltage V (IN) with the supply voltage V (B) of the battery 1 to output the drive signal to the FETs 3A and 3B.

As will be described in more detail later, the drive signal that is output from the processing circuit 9 is the combination of the PWM signals (standard PWM signals) that have a reverse-phase relationship with each other at the duty ratio of 50% with a continuous non-energization period (continuous off-state period) and a continuous energization period (continuous on-state period) according to the level of the instruction voltage V (IN).

Figure 3:
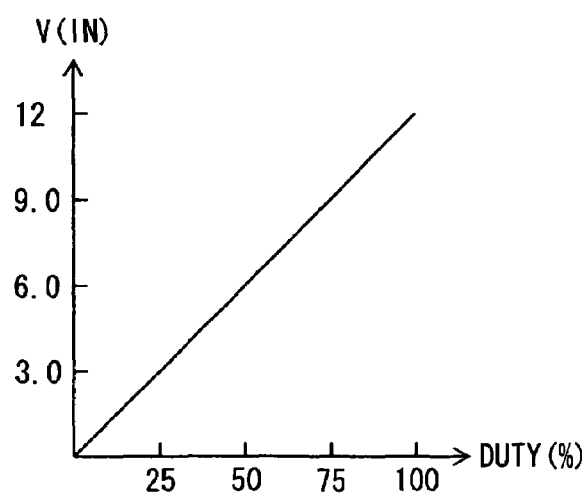
FIG. 3 is a graph showing a relationship between a duty ratio of a drive instruction and an instruction voltage.

Subsequently, the operation of this embodiment will be described with respect to FIGS. 2 to 5. FIG. 2 shows the form of a drive signal that is output by the processing circuit 9 according to the level of the instruction voltage V (IN). When the supply voltage V(B) of the battery 1 is 12 V, a relationship between the drive instruction (of the input signal) duty ratio that is output by the input circuit 11 and the converted instruction voltage V(IN) is linear as shown in FIG. 3.

The processing circuit 9 compares the instruction voltage V(IN) with the voltage V(B)/2 that is ½ of the supply voltage V(B) of the battery 1. Then, in the case of V(IN)=V(B)/2, the processing circuit 9 outputs the standard PWM signal of 50% duty. Then, the applied voltages of the respective motors 2A and 2B when the supply voltage V(B)=12 V are 6 V, respectively.

In the case of V(IN)<V(B)/2 (level lower than standard), the processing circuit 9 outputs the combination of the standard PWM signal with the continuous OFF period. When it is assumed that the respective output periods are t1 and t2, the time ratio of those output periods is determined on the basis of the control period (t1+t2) that is constantly determined and Expression (1).

$$V(IN)=t1/(t1+t2) \times V(B)/2 \qquad (1)$$

That is, since the applied voltage of the period t1 during which the standard PWM signal is output is V(B)/2, a value obtained by multiplying the ratio of the period t1 to a control cycle (t1+t2) by V(B)/2 is so adjusted as to correspond to the instruction voltage V(IN). For example, in the control of V(IN)=V(B)/4 (corresponding to the duty ratio 25% in the usual PWM control), t1=t2 can be set.

In the case of V(IN)>V(B)/2 (level higher than the standard), the processing circuit 9 outputs the combination of the standard PWM signal with the continuous ON period. When it is assumed that the respective output periods are t1 and t3, the time ratio of those output periods is determined on the basis of the control period (t1+t3) that is constantly determined as Expression (2).

$$V(IN)=(t1/2+t3)/(t1+t3) \times V(B) \qquad (2)$$

That is, since the applied voltage of the period t3 is V(B), the addition of the following expression where t2 in Expression (1) is replaced with t3 and V(B)/2 is replaced with V(B) becomes Expression (2).

$$t3/(t1+t3) \times V(B)$$

For example, in the case of V(IN)=V(B)×¾ (corresponding to the duty ratio 75%), t1=t3 can be set. The processing circuit 9 generates the drive signal according to the above principle.

Figure 4:
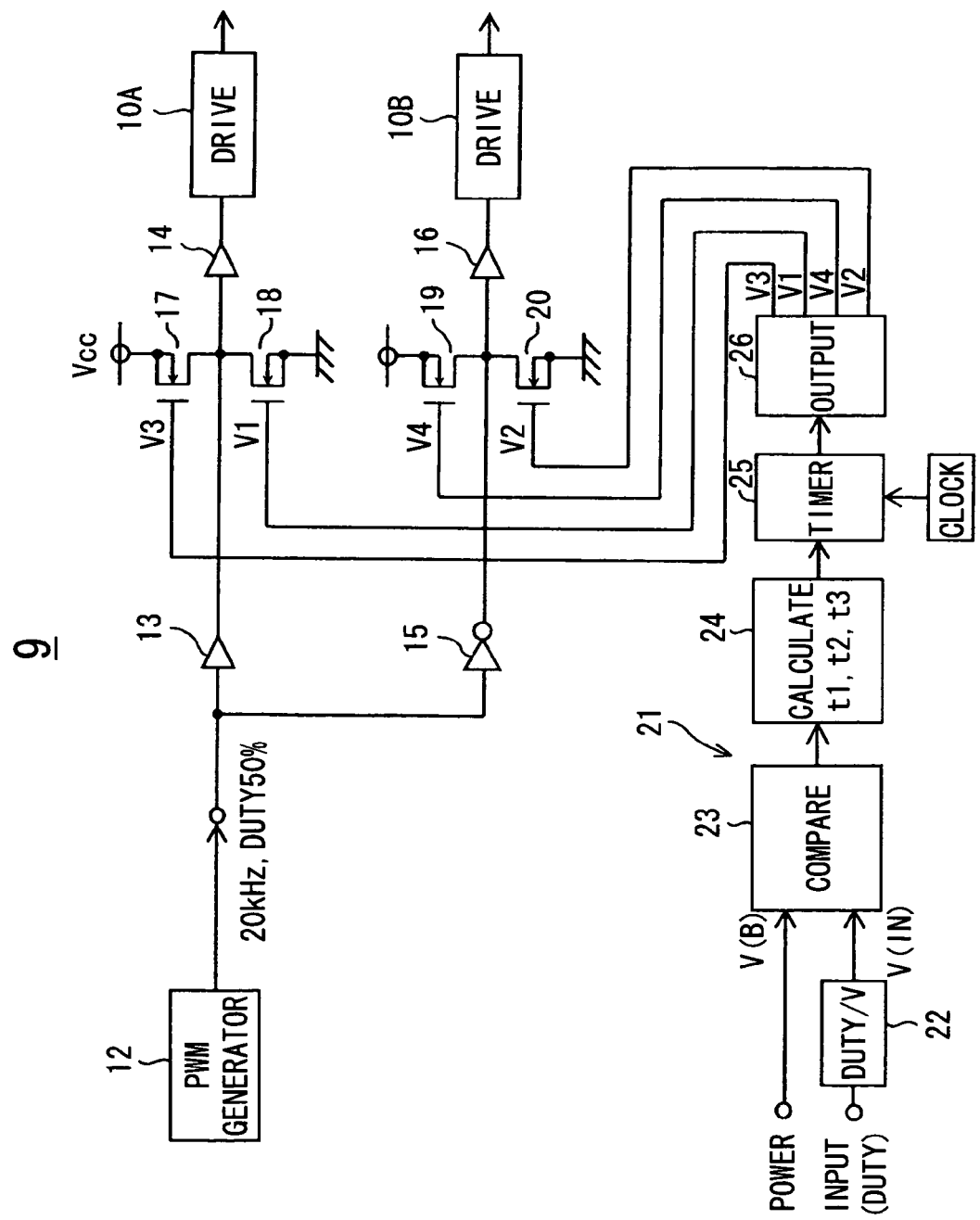
FIG. 4 is a circuit diagram showing the detailed configuration of the processing circuit.

The processing circuit 9 is configured as shown in FIG. 4. In the processing circuit 9, a PWM signal generation unit 12 generates a PWM signal of the duty ratio 50% at the carrier frequency 20 kHz. This signal is applied to the drive circuit 10A through buffers 13 and 14, and to the drive circuit 10B through an inversion buffer (NOT gate) 15 and a buffer 16.

Then, a series circuit of n-channel MOSFETs 17 and 18 and a series circuit of n-channel MOSFETs 19 and 20 are connected between the control power source Vcc and the ground. The respective common connection points are connected to the input terminals of the buffers 14 and 16. The gate signal generation unit 21 conducts the processing process according to a flowchart of FIG. 5, and outputs a gate signal to the respective gates of the FETs 17 to 20. That is, when all of the FETs 17 to 20 are in the off-state, the PWM signals that are output from the buffers 13 and 15 are output as they are. When only the FETs 18 and 20 at the ground side are in the on-state, a low level signal continues to be output to the drive circuits 10A and 10B. When only the FETs 17 and 19 of the power source side are in the on-state, a high level signal continues to be output to the drive circuits 10A and 10B.

Figure 5:
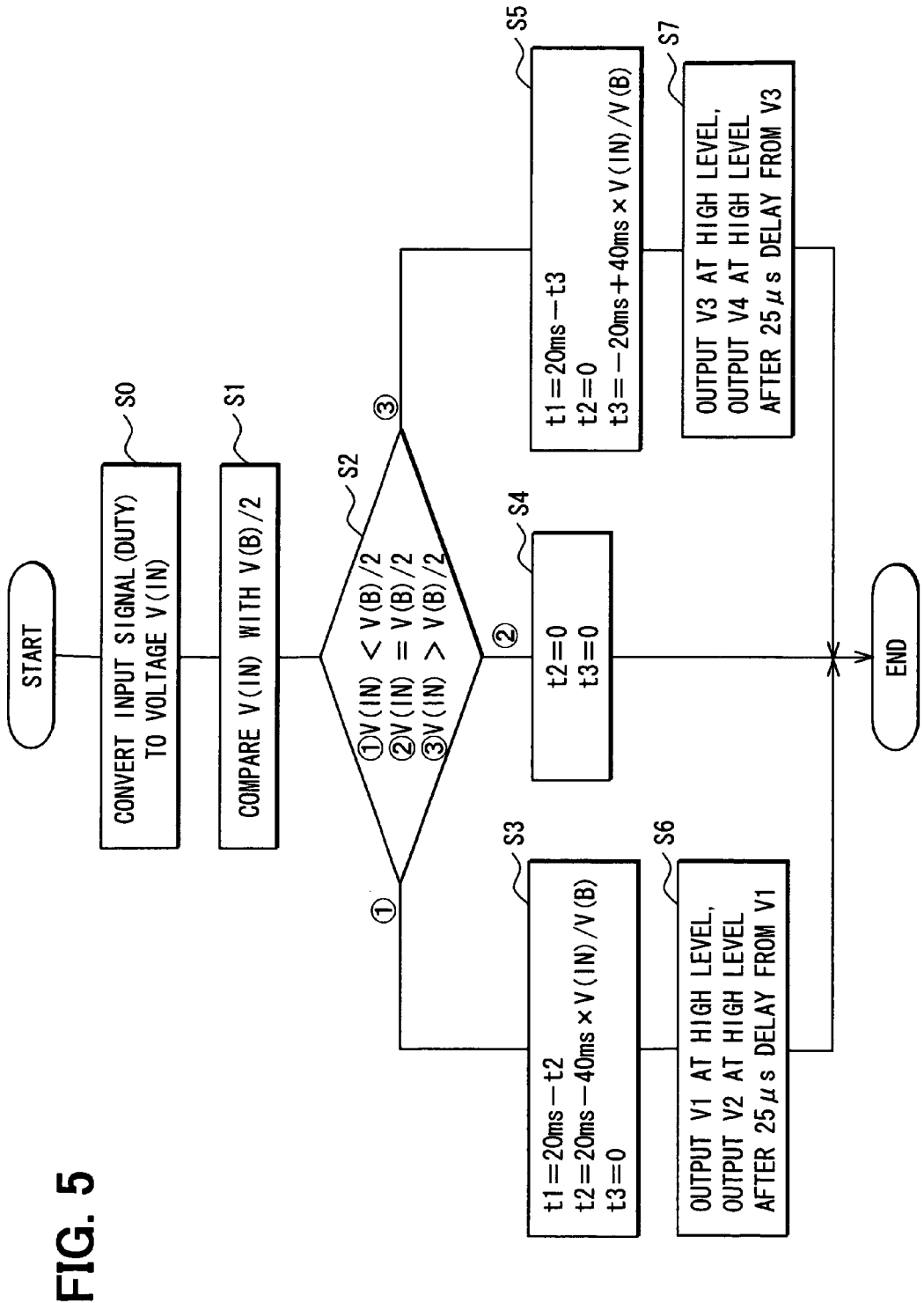
FIG. 5 is a flowchart showing the processing of the processing circuit of FIG. 4.

Referring to FIG. 5, it is assumed that the precondition is a control cycle of t1+t2=t1+t3=20 ms. When a drive instruction that is output from the input circuit 11 is subjected to duty/voltage conversion (step S0) in a duty/voltage conversion unit 22, the instruction voltage V (IN) and the voltage V(B)/2 are compared with each other (step S1) by a comparison unit 23. The processing is branched according to the first to the third cases of V(IN)<V(B)/2, V(IN)=V(B)/2, and V(IN)>V(B)/2 (step S2), respectively.

In the first case of the level lower than the standard, t2 is calculated by Expression (3) on the basis of the control cycle conditions and Expression (1) (Step S3).

$$t2=20 \text{ ms}-40 \text{ ms} \times V(IN)/V(B) \qquad (3)$$

$$t1=20 \text{ ms}-t2, \text{ and}$$

$$t3=0$$

In the second case of the standard level, since the standard PWM signal is merely output, t2=t3=0 is satisfied (step S4).

In the third case of the level higher than the standard, t3 is calculated from Expression (4) on the basis of the control cycle condition and Expression (2) (step S5).

$$t3=-20 \text{ ms}+40 \text{ ms} \times V(IN)/V(B) \qquad (4)$$

$$t1=20 \text{ ms}-t3, \text{ and}$$

$$t2=0$$

The processing in steps S3 to S5 corresponds to the processing circuit 24 in FIG. 4.

At step S6 following step S3, gate signals V1 and V2 are output to the FETs 18 and 20 at the ground side, respectively. Since the PWM control period is 50 μs, the gate signal V2 at the reverse phase side is changed over to high level 25 μm after the gate signal V1 at the positive phase side is changed over to high level.

On the other hand, at step S7 following step S5, gate signals V3 and V4 are output to the FETs 17 and 19 at the power source side, respectively. The gate signals V3 and V4 are applied with the high level that exceeds the control power source Vcc by the aid of a booster circuit. Similarly, in this case, the gate signal V4 at the reverse phase side is changed over to high level 25 μm after the gate signal V3 at the positive phase side is changed over to high level. The processing in steps S6 and S7 corresponds to a timer unit 25 and an output unit 26 in FIG. 4. The timer unit 25 conducts the timing operation according to clock that is given to the processing circuit 9. As a result of the above processing, the drive signal is output in the form shown in FIG. 2.

According to this embodiment, the standard duty ratio of the PWM signal used to drive the two motors 2A and 2B is set to 50% (m=2). When the level of the drive command corresponds to the standard duty ratio, the PWM signals of the standard duty ratio are output to the motors 2A and 2B by a phase (reverse phase relationship) where the energization periods of the respective motors 2A and 2B do not overlap with each other. Also, when the level of the drive instruction is lower than the standard, the continuous off-period and the standard PWM signal are changed over at the ratio corresponding to the level of drive instruction, and output. When the level of the drive instruction is lower than the standard, the continuous off-period and the standard PWM signal are changed over at the ratio corresponding to the level of drive instruction, and output. More specifically, when the level of the drive instruction is lower than the standard, the ratio of the periods t1 and t2 is set by Expression (1). When the level of the drive instruction is higher than the standard, the ratio of the periods t1 and t3 is set by Expression (2). Accordingly, the PWM control can be conducted by more extending the applied voltage range of the motor 2 while suppressing the occurrence of the current ripples in the battery 1.

Since the standard duty ratio is set to 50% resulting from equally dividing 100% by the number of motors 2, the energization periods of the respective motors 2A and 2B become uniform in the output period of the standard PWM signal, and the outputs of the motors 2A and 2B can be maximized during the period while suppressing the occurrence of the current ripple.

When the level of the drive instruction is lower than the standard or higher than the standard, it is assumed that the vibrations or noises which are accompanied by the rotation drive of the motor 2 slightly increase as compared with the case of the standard level. However, when the cooling fan that is arranged in the vehicle is driven, because the drive noises of the motor does not cause a problem so much, there will be no trouble in a practical use.

Second Embodiment

Figure 6:
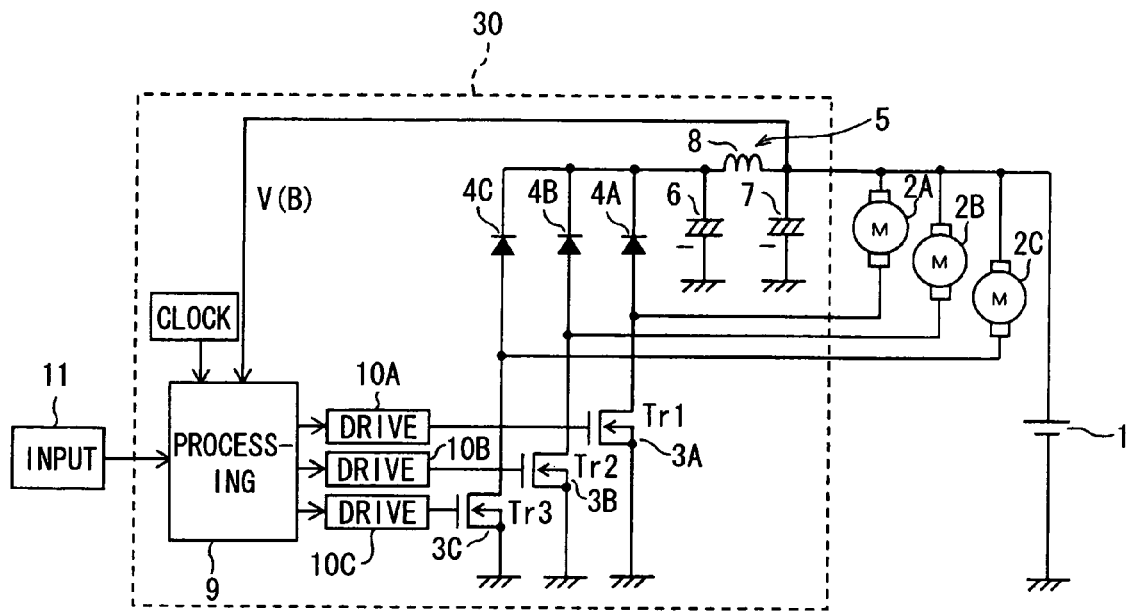
FIG. 6 is a circuit diagram showing a load driving device according to a second embodiment of the present invention.
Figure 7:
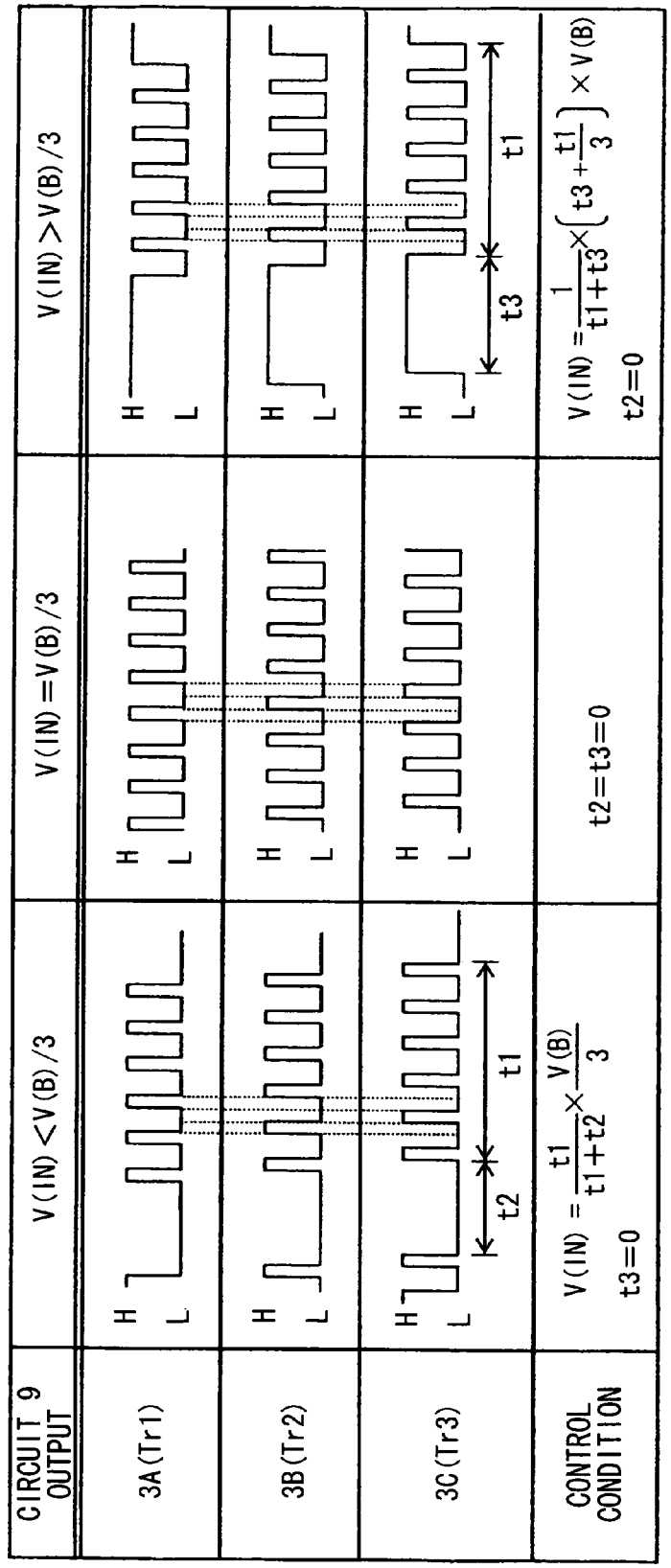
FIG. 7 is a table showing drive signals that are output by a processing circuit in the second embodiment.

In a second embodiment shown in FIGS. 6 and 7, the number of motors 2 to be driven is increased to three. That is, in the load drive device 30, the addition of a third motor 2C causes an arrangement of an n-channel MOSFET 3C, a diode 4C, and a drive circuit 10C.

The processing circuit 9 outputs a drive signal to the respective motors 2A, 2B and 2C in the configuration shown in FIG. 7. In this case, the standard duty ratio is 33.3% obtained by dividing 100% by the number (three) of loads, and the processing circuit 9 compares the instruction voltage V(IN) with a voltage V(B)/3.

In the case of V(IN)=V(B)/3, the standard PWM signal is output, and the respective phase differences of the standard PWM signals which are given to the respective motors 2A, 2B and 2C are 120 degrees, and the on-periods due to the PWM signals do not overlap with each other. In this situation, the applied voltage of the respective motors 2A, 2B and 2C are 4 V, respectively, with respect to the supply voltage V(B)=12 V.

Also, in the case of V(IN)<V(B)/3 (level lower than the standard), the combination of the standard PWM signal with the continuous off-period is output as in the first embodiment, but the respective output periods t1 and t2 are determined on the basis of the control cycle and Expression (5).

$$V(IN)=t1/(t1+t2)\times V(B)/3 \quad (5)$$

Also, in the case of V(IN)>V(B)/3 (level higher than the standard), the combination of the standard PWM signal with the continuous ON period is output, and the respective output periods t1 and t3 are determined on the basis of the control period and Expression (6).

$$V(IN)=(t1/3+t3)/(t1+t3)\times V(B) \quad (6)$$

According to the second embodiment, even when the number of motors 2 that are driven at the same time is three, the same advantages as those in the first embodiment can be obtained.

Third Embodiment

In a third embodiment shown in FIG. 8, a drive signal configuration in which the standard duty ratio is 33.3% (same as in the second embodiment) is set in the circuit configuration of the first embodiment (FIG. 1). In this situation, when V(IN)=V(B)/3, the phase difference of the standard PWM signal that is given to the respective motors 2A and 2B is 120 degrees. Accordingly, both of the motors 2A and 2B are not energized during the ⅓ period of the PWM period.

In the case of V(IN)<V(B)/3 (level lower than the standard) and in the case of V(IN)>V(B)/3 (level higher than the standard), the same signal configuration as that in the second embodiment is output to the two motors 2A and 2B.

According to the third embodiment, when the number of motors 2 is two, the substantially same advantages as those in the first embodiment can be provided even if the duty ratio of the standard PWM signal is set to 33.3%.

Fourth Embodiment

Figure 9:
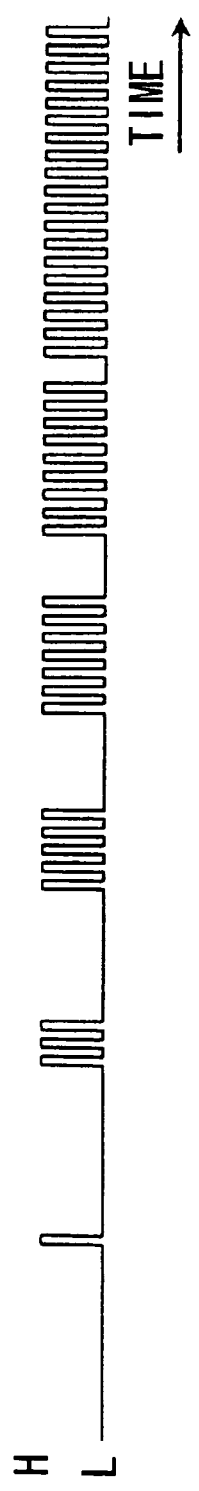
FIG. 9 is a time chart showing an output pattern of a standard PWM signal according to a fourth embodiment of the present invention.

In a fourth embodiment shown in FIG. 9, for example, when the respective output periods t1, t2 and t3 are calculated and determined in steps S3 to S5 (FIG. 5), the drive signal of the configuration shown in FIG. 2 is not immediately output according to the respective cases. However, as startup control, the number of output pulses of the standard PWM signals are gradually increased.

For example, in the case of V(IN)=V(B)/4, the period t1 is 10 ms, and the number of output pulses of the PWM signal during that period is two hundreds (200). In this situation, the number of output pulses reaches 200 after a given period of time has elapsed in such a manner that the number of pulses that is output within the period t1 in the respective control cycles is increased to, for example, 1, 3, 5, 7, 9 . . . , or 2, 4, 8, 16, 32, . . .

Also, in the case of V(IN)=V(B)/2, for example, the control cycle is sectioned by 20 ms whereby the number of pulses that are output within the cycle gradually increases until reaching four hundreds (400) as in the same manner as that described above. Further, in the case of V(IN)=V(B)¾, the continuous on period can be gradually made longer after going through a pattern in the case of V(IN)=V(B)/2.

As described above, since the startup control is conducted, the applied voltage in the case of starting the motor 2 can be gradually increased.

According to the fourth embodiment, when the signal output pattern with respect to the motor 2 is determined according to the drive instruction, the startup control is conducted so that the output period of the standard PWM signal is gradually made longer from zero (0) to a determined period. As a result, the energization current is gradually increased, thereby making it possible to reduce an inrush current by gradually increasing the energization current.

Fifth Embodiment

Figure 10:
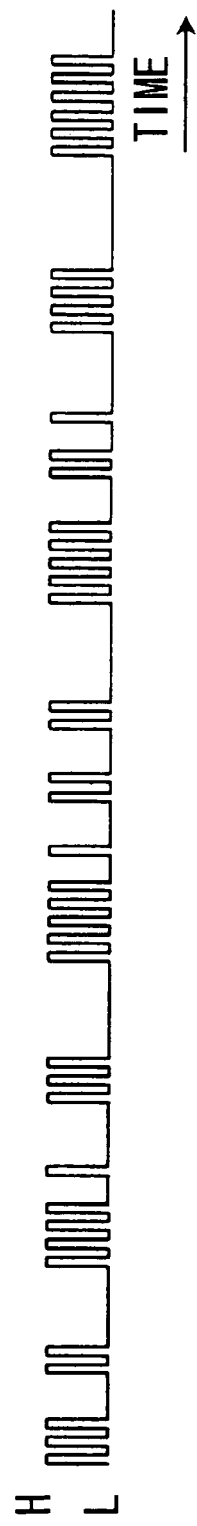
FIG. 10 is a time chart showing an output pattern of a standard PWM signal according to a fifth embodiment of the present invention.

In a fifth embodiment shown in FIG. 10, after the respective output periods t1, t2 and t3 are calculated and determined in steps S3 to S5 (FIG. 5), the control periods (t1+t2) and (t1+t3) in the case where the instruction voltage V(IN) has a level lower than the standard or higher than the standard change at random. When the control cycle is averaged within the given period, a limit is made so that the control cycle is held constant (for example, 20 ms).

According to the fifth embodiment, the signal output cycle that is determined by a sum of the continuous off-period and the output period of the standard PWM signal, or the signal output period that is determined by a sum of the continuous on-period and the output period of the standard PWM signal is varied at random. As a result, the average within the given period is so controlled as to become an output level corresponding to the drive instruction. Therefore, the periodicity of the output pattern is reduced as much as possible, thereby making it possible to suppress the occurrence of the vibrations or the noises.

Sixth Embodiment

Figure 11:
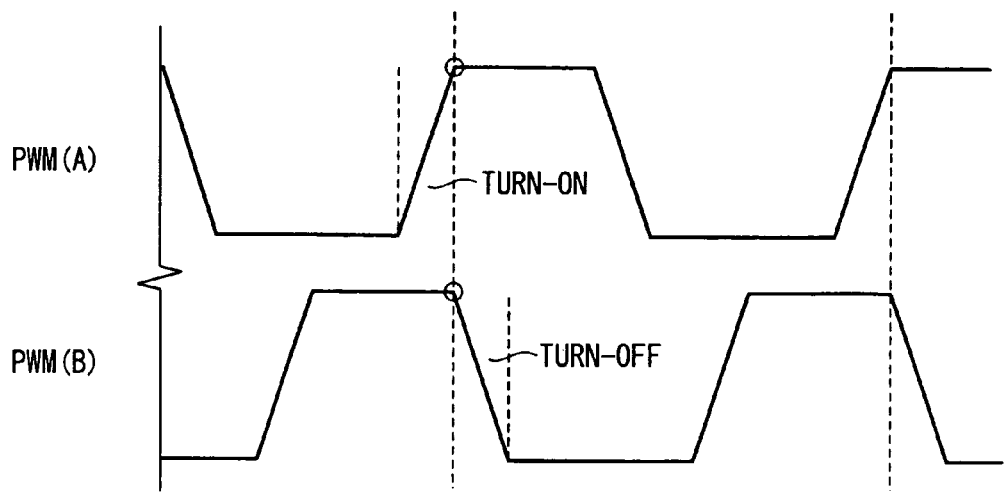
FIG. 11 is a waveform diagram showing the standard PWM signal according to a sixth embodiment of the present invention.

In a sixth embodiment shown in FIG. 11, the standard PWM signal is formed in a trapezoidal waveform and output. Such a phase relationship that a falling start time of the signal (B) and the rising end time of the signal (A) coincide with each other is satisfied, thereby preventing one turn-off period and another turn-off period from overlapping with each other. The details of the above technique are disclosed in U.S. Pat. No. 6,891,342 (JP 2004-72592A).

That is, with the trapezoidal waveform of the PWM signal, the rising and falling of the signal waveform become gentle. As a result, the occurrence of noises can be suppressed. In addition, when the standard PWM signal is output at a phase where the rising period and the falling period do not overlap with each other, the overlapping of the period during which the energization current changes can be also avoided.

According to the sixth embodiment, the standard PWM signal is brought in the trapezoidal waveform, and output at a phase where the rising period (turn-on period) of the waveform and falling period (turn-off period) of the waveform do not overlap with each other. As a result, the occurrence of the noises is suppressed, and the occurrence of the ripple can be suppressed when the PWM signal of the trapezoidal waveform is applied.

Seventh Embodiment

Figure 12:
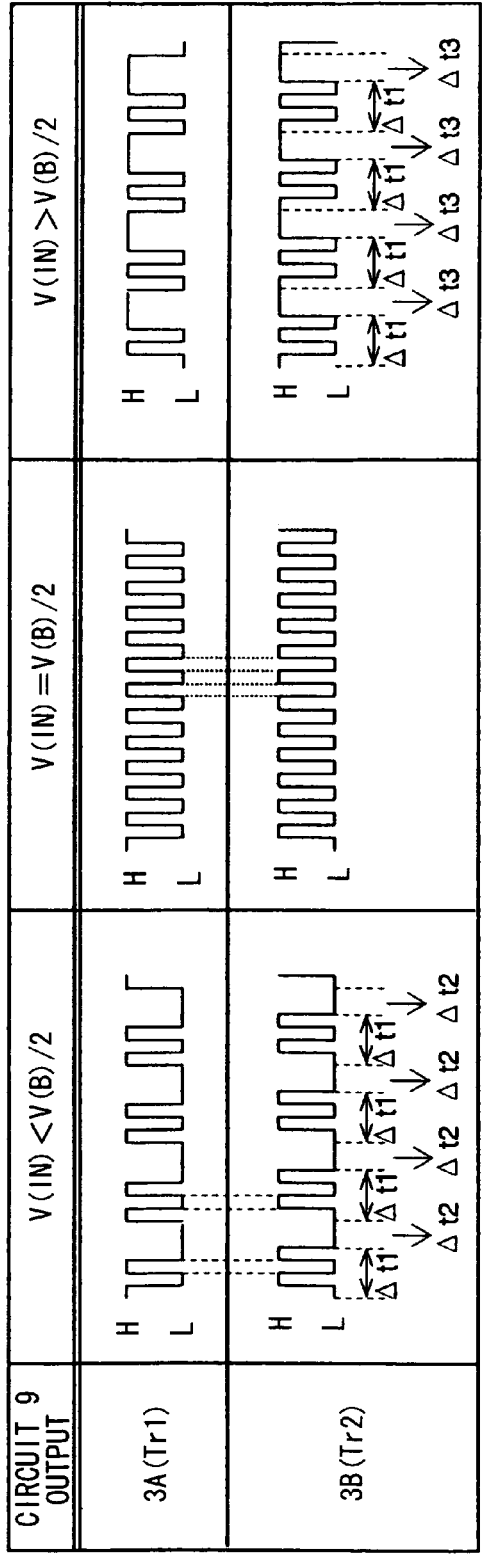
FIG. 12 is a table showing drive signals that are output by a processing circuit according to a seventh embodiment of the present invention.

In a seventh embodiment shown in FIG. 12, for example, as in the first embodiment, in the case of V(IN)<V(B)/2 (level lower than the standard), the time ratio of the respective output periods t1 and t2 of the standard PWM signal and the continuous off-period is determined on the basis of both the control cycle (t1+t2) that is constantly determined and Expression (1). Then, the standard PWM signal and the continuous off-period are so set as to be alternately repeated in a given pattern after the above time ratio is satisfied within the control cycle (t1+t2).

Similarly, in the case of V(IN)>V(B)/2 (level higher than the standard), the time ratio of the respective output periods t1 and t2 of the standard PWM signal and the continuous on-period is determined on the basis of both the control cycle (t1+t3) that is constantly determined and Expression (2). The output period of the standard PWM signal and the continuous ON period are so set as to be alternately repeated in a given pattern after the above time ratio is satisfied within the control cycle (t1+t3).

In the case shown in FIG. 12, a pattern where the continuous off-period or the continuous on-period is arranged is repeated after the standard PWM signals are output by two pulses. For example, in the case of V(IN)<V(B)/2, when it is assumed that a period during which the standard PWM signal is output by two pulses is Δt1, and the division period of the continuous off-period is Δt2, a total of Δt1 within the control cycle (t1+t2) becomes t1, and a total of Δt2 becomes t2.

Similarly, in the case of V(IN)>V(B)/2, when it is assumed that a period during which the standard PWM signal is output by two pulses is Δt1, and the division period of the continuous on-period is Δt3, a total of Δt1 within the control cycle (t1+t3) becomes t1, and a total of Δt3 becomes t3.

The above process will be described with reference to a flowchart of the first embodiment shown in FIG. 5. For example, in the case of V(IN)<V(B)/2, the above process is executed by determining the arrangement pattern of Δt1 and Δt2, that is, a pattern by which the gate signal V1 is made high in level after the time ratio of t1 and t2 has been determined in step S3. Similarly, in the case of V(IN)>V(B)/2, the arrangement pattern of Δt1 and Δt3 (a pattern by which the gate signal V3 is made high in level) can be determined after the time ratio of t1 and t3 has been determined in step S5.

According to the seventh embodiment, when the level of the drive instruction is lower than the standard, the output period of the standard PWM signal and the continuous off-period are alternately repeated in the given pattern within the control cycle according to the ratio of the periods t1 and t2. When the level of the drive instruction is higher than the standard, the output period of the standard PWM signal and the continuous on-period are alternately repeated in the given pattern within the control cycle according to the ratio of the periods t1 and t3. Similarly, the above configuration provides the same advantages as those in the first embodiment.

Eighth Embodiment

Figure 13:
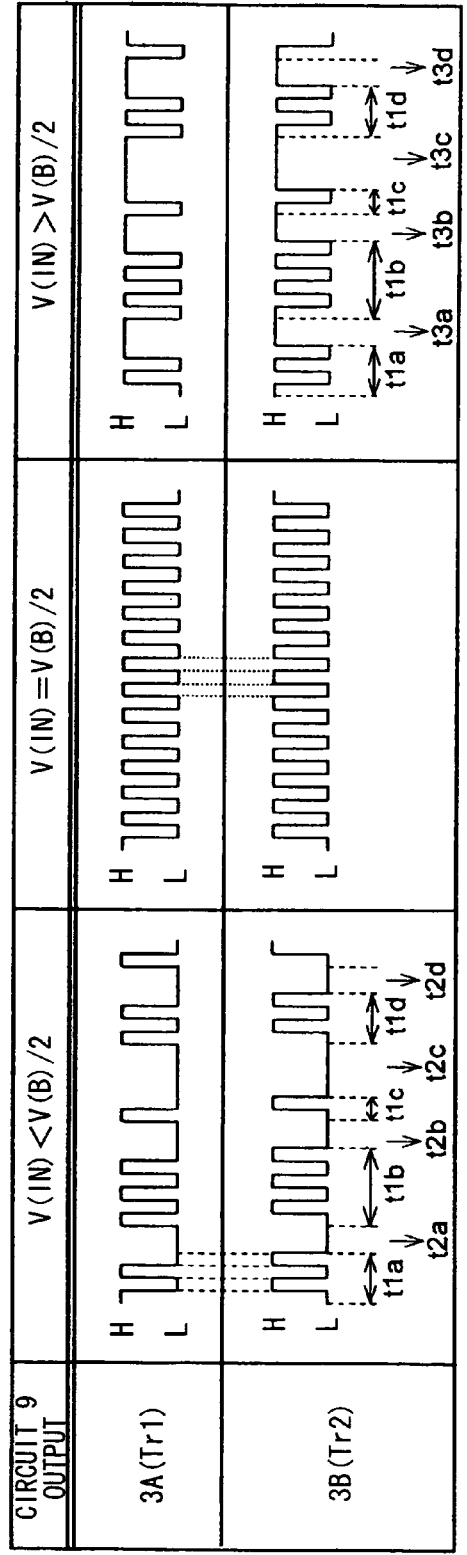
FIG. 13 is a table showing drive signals that are output by a processing circuit according to an eighth embodiment of the present invention.

In an eighth embodiment shown in FIG. 13, for example, as in the seventh embodiment, in the case of V(IN)<V(B)/2 (level lower than the standard), when the time ratio of both the output periods t1 and t2 is determined, the standard PWM signal and the continuous off-period are dispersed at random after the above time ratio is satisfied within the control cycle (t1+t2). Similarly, in the case of V(IN)>V(B)/2 (level higher than the standard), when the time ratio of the respective output periods t1 and t3 is determined, the output period of the standard PWM signal and the continuous on-period are dispersed at random after the above time ratio is satisfied within the control cycle (t1+t3).

For example, in the case of V(IN)<V(B)/2, when it is assumed that the respective periods during which the pulses of the standard PWM signal are output are t1$a$, t1$b$, t1$c$ and t1$d$, and the division periods of the continuous off-period are t2$a$, t2$b$, t2$c$, and t2$d$, a total of the periods t1$a$ to t1$d$ within the control cycle (t1+t2) becomes t1, and a total of the periods t2$a$ to t2$d$ becomes t2. Similarly, in the case of V(IN)>V(B)/2, when it is assumed that the respective periods during which the pulses of the standard PWM signal are output are t1$a$, t1$b$, t1$c$ and t1$d$, and the division periods of the continuous on-period are t3$a$, t3$b$, t3$c$ and t3$d$, a total of the periods t1$a$ to t1$d$ within the control cycle (t1+t3) becomes t1, and a total of the periods t3$a$ to t3$d$ becomes t3.

In the flowchart of FIG. 5 similarly to the seventh embodiment, in the case of V(IN)<V(B)/2, this process is also conducted by determining the respective times and the arrangement pattern of another group after the respective times and the arrangement pattern of any one group of t1a to t1d and t2a to t2d have been determined after step S3. Similarly, in the case of V(IN)>V(B)/2, the respective times and the arrangement pattern of t1a to t1d and t3a to t3d are determined after the time ratio of t1 and t3 has been determined in step S5. In this case, because conditions are added to the selection of numeric values even at random, the time ratio is substantially determined at artificial random.

According to the eighth embodiment, when the level of the drive instruction is lower than the standard, the output period of the standard PWM signal and the continuous off-period are dispersed within the control cycle at random according to the ratio of the periods t1 and t2. When the level of the drive instruction is higher than the standard, the output period of the standard PWM signal and the continuous on-period are dispersed within the control cycle at random according to the ratio of the periods t1 and t3. Accordingly, the periodicity that appears in the output period of the standard PWM signal and the output state of the continuous off-period or the continuous on-period can be relaxed, thereby making it possible to suppress the occurrence level of the noise.

The present invention is not limited to only the embodiments described above and shown in the figures, but can be modified as follows.

For instance, the number of loads can be four (4) or more. The high side drive can be conducted instead of the low side drive. The switching element is not limited to the MOSFET, but a power transistor or an IGBT can be used. The load is not limited to the motor 2, but can be formed of a solenoid or a resistor body such as a lamp or a heater. The carrier frequency of the PWM control is not limited to 20 kHz, but can be appropriately changed and implemented.

Further, the output pattern of the seventh embodiment is an example, and can be implemented by appropriately changing the pattern. The configurations of the seventh and eighth embodiments can be applied to the configuration of the second embodiment.

The present invention is not limited to the application to a device for driving the vehicle cooling fan, but can be widely applied when the plural loads are driven by using the PWM signal.

What is claimed is:

1. A load driving device for independently driving a plurality of loads connected to a power source by a PWM (pulse-width modulation) control method, the load driving device comprising control means, which is configured to:

set a standard duty ratio of a PWM signal used in driving the plurality of loads to (100/n)% with "n" indicating the number of the plurality of loads;

output a standard PWM signal, which is the PWM signal of the standard duty ratio outputted to one load of the plurality of loads, in a phase not to overlap in respect of energization periods with a standard PWM signal outputted to another load of the plurality of loads;

output, when a voltage level of a drive instruction for the load corresponds to a level at the standard duty ratio, the standard PWM signal to each of the plurality of loads, wherein the standard PWM signal outputted to the one load is shifted in time from the standard PWM signal outputted to the another load, so that the standard PWM signal outputted to the another load rises when the standard PWM signal outputted to the one load falls;

output, when the voltage level of the drive instruction corresponds to a level lower than the level of the standard duty ratio, which is defined as an under-standard level, a continuous non-energization period and the standard PWM signal by changing over the continuous non-energization period and the standard PWM signal at a ratio corresponding to the voltage level of the drive instruction, wherein the standard PWM signal outputted to the one load is shifted in time from the standard PWM signal outputted to the another load, so that the standard PWM signal outputted to the another load rises when the standard PWM signal outputted to the one load falls from the energization period, and wherein the continuous non-energization period outputted to the one load is shifted in time from the continuous non-energization period outputted to the another load, so that the standard PWM signal outputted to the another load rises when the standard PWM signal falls from the energization period; and output, when the voltage level of the drive instruction corresponds to a level higher than the level at the standard duty ratio, which is defined as an over-standard level, a continuous energization period and the standard PWM signal by changing over the continuous energization period and the standard PWM signal at a ratio corresponding to the voltage level of the drive instruction, wherein the standard PWM signal outputted to the one load is shifted in time from the standard PWM signal outputted to the another load, so that the standard PWM signal outputted to the another load rises when the standard PWM signal outputted to the one load falls from the energization period, and wherein the continuous energization period outputted to the one load is shifted in time from the continuous energization period outputted to the another load, so that the standard PWM signal outputted to the another load rises when the standard PWM signal falls from the energization period.

2. The load driving device according to claim 1, wherein the control means is configured to, assuming that the standard duty ratio is set to (100/m)% (m=n), V(B) is a supply voltage, V(IN) is the voltage level of the drive instruction, t1 is an output period of the standard PWM signal, t2 is the continuous non-energization period, and t3 is the continuous energization period:

set a ratio of the periods t1 and t2 to satisfy V(IN)=t1/(t1+t2)×V(B)/m, when the voltage level of the drive instruction of the loads is the under-standard level; and set a ratio of periods t1 and t3 to satisfy V(IN)=(t1/m+t3)/(t1+t3)×V(B), when the voltage level of the drive instruction of the loads is the over-standard level.

3. The load driving device according to claim 2, wherein:

an output period of the standard PWM signal and the continuous non-energization period are alternately repeated in a given pattern within a control cycle (t1+t2) according to the ratio of the periods t1 and t2; and an output period of the standard PWM signal and the continuous energization period are alternately repeated in a given pattern within a control cycle (t1+t3) according to the ratio of the periods t1 and t3.

4. The load driving device according to claim 2, wherein:

an output period of the standard PWM signal and the continuous non-energization period are dispersed at random within a control cycle (t1+t2) according to the ratio of the periods t1 and t2; and an output period of the standard PWM signal and the continuous energization period are dispersed at random within a control cycle (t1+t3) according to the ratio of the periods t1 and t3.

5. The load driving device according to claim 1, wherein the control means is configured to conduct startup control so that an output period of the standard PWM signal is gradually increased from zero to a determined period when a signal output pattern to the plurality of loads is determined according to the drive instruction.

6. The load driving device according to claim 2, wherein the control means is configured to conduct startup control so that an output period of the standard PWM signal is gradually increased from zero to a determined period when a signal output pattern to the plurality of loads is determined according to the drive instruction.

7. The load driving device according to claim 3, wherein the control means is configured to conduct startup control so that an output period of the standard PWM signal is gradually increased from zero to a determined period when a signal output pattern to the plurality of loads is determined according to the drive instruction.

8. The load driving device according to claim 4, wherein the control means is configured to conduct startup control so that an output period of the standard PWM signal is gradually increased from zero to a determined period when a signal output pattern to the plurality of loads is determined according to the drive instruction.

9. The load driving device according to claim 1, wherein the control means is configured to change at random a signal output period that is determined by a sum of the continuous non-energization period and an output period of the standard PWM signal, or a signal output period that is determined by a sum of the continuous energization period and an output period of the standard PWM signal, so that an average within those given periods is controlled to the voltage level of the drive instruction.

10. The load driving device according to claim 2, wherein the control means is configured to change at random a signal output period that is determined by a sum of the continuous non-energization period and an output period of the standard PWM signal, or a signal output period that is determined by a sum of the continuous energization period and an output period of the standard PWM signal, so that an average within those given periods is controlled to the voltage level of the drive instruction.

11. The load driving device according to claim 3, wherein the control means is configured to change at random a signal output period that is determined by a sum of the continuous non-energization period and an output period of the standard PWM signal, or a signal output period that is determined by a sum of the continuous energization period and an output period of the standard PWM signal, so that an average within those given periods is controlled to the voltage level of the drive instruction.

12. The load driving device according to claim 4, wherein the control means is configured to change at random a signal output period that is determined by a sum of the continuous non-energization period and an output period of the standard PWM signal, or a signal output period that is determined by a sum of the continuous energization period and an output period of the standard PWM signal, so that an average within those given periods is controlled to the voltage level of the drive instruction.

13. The load driving device according to claim 5, wherein the control means is configured to change at random a signal output period that is determined by a sum of the continuous non-energization period and an output period of the standard PWM signal, or a signal output period that is determined by a sum of the continuous energization period and an output period of the standard PWM signal, so that an average within those given periods is controlled to the voltage level of the drive instruction.

14. The load driving device according to claim 1, wherein the control means is configured to shape the standard PWM signal in a trapezoidal waveform, and produce the PWM signal at phase where a rising period and a falling period of the waveform do not overlap with each other.

15. The load driving device according to claim 2, wherein the control means is configured to shape the standard PWM signal in a trapezoidal waveform, and produce the PWM signal at phase where a rising period and a falling period of the waveform do not overlap with each other.

16. The load driving device according to claim 3, wherein the control means is configured to shape the standard PWM signal in a trapezoidal waveform, and produce the PWM signal at phase where a rising period and a falling period of the waveform do not overlap with each other.

17. The load driving device according to claim 4, wherein the control means is configured to shape the standard PWM signal in a trapezoidal waveform, and produce the PWM signal at phase where a rising period and a falling period of the waveform do not overlap with each other.

18. The load driving device according to claim 5, wherein the control means is configured to shape the standard PWM signal in a trapezoidal waveform, and produce the PWM signal at phase where a rising period and a falling period of the waveform do not overlap with each other.

19. The load driving device according to claim 9, wherein the control means is configured to shape the standard PWM signal in a trapezoidal waveform, and produce the PWM signal at phase where a rising period and a falling period of the waveform do not overlap with each other.

20. A load driving method for independently driving a plurality of loads connected to a power source by a PWM (pulse-width modulation) control method, the load driving method comprising the steps of:
   setting a standard duty ratio of a PWM signal used in driving the plurality of loads to (100/n)% with "n" indicating the number of the plurality of loads;
   outputting a standard PWM signal, which is the PWM signal of the standard duty ratio outputted to one load of the plurality of loads, in a phase not to overlap in respect of energization periods with a standard PWM signal outputted to another load of the plurality of loads;
   outputting, when a voltage level of a drive instruction for the load corresponds to a level at standard duty ratio, the standard PWM signal to each of the plurality of loads, wherein the standard PWM signal outputted to the one load is shifted in time from the standard PWM signal outputted to the another load, so that the standard PWM signal outputted to the another load rises when the standard PWM signal outputted to the one load falls;
   outputting, when the voltage level of the drive instruction corresponds to a level lower than the level at the standard duty ratio, which is defined as an under-standard level, a continuous non-energization period and the standard PWM signal by changing over the continuous non-energization period and the standard PWM signal at a ratio corresponding to the voltage level of the drive instruction,
   wherein the standard PWM signal outputted to the one load is shifted in time from the standard PWM signal outputted to the another load, so that the standard PWM signal outputted to the another load rises when the standard PWM signal outputted to the one load falls from the energization period, and wherein the continuous non-energization period outputted to the one load is shifted in time from the continuous non-energization period outputted to the another load, so that the standard PWM signal outputted to the another load rises when the standard PWM signal falls from the energization period; and outputting, when the voltage level of the drive instruction corresponds to a level higher than the level at the standard duty ratio, which is defined as an over-standard level, a continuous energization period and the standard PWM signal by changing over the continuous energization period and the standard PWM signal at a ratio corresponding to the voltage level of the drive instruction, wherein the standard PWM signal outputted to the one load is shifted in time from the standard PWM signal outputted to the another load, so that the standard PWM signal outputted to the another load rises when the standard PWM signal outputted to the one load falls from the energization period, and wherein the continuous energization period outputted to the one load is shifted in time from the continuous energization period outputted to the another load, so that the standard PWM signal outputted to the another load rises when the standard PWM signal falls from the energization period.

21. The load driving method according to claim 20, wherein the step of setting includes, assuming that the standard duty ratio is set to $(100/m)\%$ ($m=n$), $V(B)$ is a supply voltage, $V(IN)$ is the voltage level of the drive instruction, $t1$ is an output period of the standard PWM signal, $t2$ is the continuous non-energization period, and $t3$ is the continuous energization period:

setting a ratio of the periods $t1$ and $t2$ to satisfy $V(IN)=t1/(t1+t2) \times V(B)/m$, when the voltage level of the drive instruction of the loads is the under-standard level; and setting a ratio of periods $t1$ and $t3$ to satisfy $V(IN)=(t1/m+t3)/(t1+t3) \times V(B)$, when the voltage level of the drive instruction of the loads is the over-standard level.

22. The load driving method according to claim 21, wherein:

an output period of the standard PWM signal and the continuous non-energization period are alternately repeated in a given pattern within a control cycle ($t1+t2$) according to the ratio of the periods $t1$ and $t2$; and an output period of the standard PWM signal and the continuous energization period are alternately repeated in a given pattern within a control cycle ($t1+t3$) according to the ratio of the periods $t1$ and $t3$.

23. The load driving method according to claim 21, wherein:

an output period of the standard PWM signal and the continuous non-energization period are dispersed at random within a control cycle ($t1+t2$) according to the ratio of the periods $t1$ and $t2$; and an output period of the standard PWM signal and the continuous energization period are dispersed at random within a control cycle ($t1+t3$) according to the ratio of the periods $t1$ and $t3$.

24. The load driving method according to claim 20, further comprising the step of conducting startup control so that an output period of the standard PWM signal is gradually increased from zero to a determined period when a signal output pattern to the plurality of loads is determined according to the drive instruction.

25. The load driving method according to claim 21, further comprising the step of conducting startup control so that an output period of the standard PWM signal is gradually increased from zero to a determined period when a signal output pattern to the plurality of loads is determined according to the drive instruction.

26. The load driving method according to claim 22, further comprising the step of conducting startup control so that an output period of the standard PWM signal is gradually increased from zero to a determined period when a signal output pattern to the plurality of loads is determined according to the drive instruction.

27. The load driving method according to claim 23, further comprising the step of conducting startup control so that an output period of the standard PWM signal is gradually increased from zero to a determined period when a signal output pattern to the plurality of loads is determined according to the drive instruction.

28. The load driving method according to claim 20, further comprising the step of changing at random a signal output period that is determined by a sum of the continuous non-energization period and an output period of the standard PWM signal, or a signal output period that is determined by a sum of the continuous energization period and an output period of the standard PWM signal, so that an average within those given periods is controlled to the voltage level of the drive instruction.

29. The load driving method according to claim 21, further comprising the step of changing at random a signal output period that is determined by a sum of the continuous non-energization period and an output period of the standard PWM signal, or a signal output period that is determined by a sum of the continuous energization period and an output period of the standard PWM signal, so that an average within those given periods is controlled to the voltage level of the drive instruction.

30. The load driving method according to claim 22, further comprising the step of changing at random a signal output period that is determined by a sum of the continuous non-energization period and an output period of the standard PWM signal, or a signal output period that is determined by a sum of the continuous energization period and an output period of the standard PWM signal, so that an average within those given periods is controlled to the voltage level of the drive instruction.

31. The load driving method according to claim 23, further comprising the step of changing at random a signal output period that is determined by a sum of the continuous non-energization period and an output period of the standard PWM signal, or a signal output period that is determined by a sum of the continuous energization period and an output period of the standard PWM signal, so that an average within those given periods is controlled to the voltage level of the drive instruction.

32. The load driving method according to claim 24, further comprising changing at random a signal output period that is determined by a sum of the continuous non-energization period and an output period of the standard PWM signal, or a signal output period that is determined by a sum of the continuous energization period and an output period of the standard PWM signal, so that an average within those given periods is controlled to the voltage level of the drive instruction.

33. The load driving method according to claim 20, further comprising the step of shaping the standard PWM signal in a trapezoidal waveform, and producing the PWM signal at phase where a rising period and a falling period of the waveform do not overlap with each other.

34. The load driving method according to claim 21, further comprising the step of shaping the standard PWM signal in a trapezoidal waveform, and producing the PWM signal at phase where a rising period and a falling period of the waveform do not overlap with each other.

35. The load driving method according to claim 22, further comprising the step of shaping the standard PWM signal in a trapezoidal waveform, and producing the PWM signal at phase where a rising period and a falling period of the waveform do not overlap with each other.

36. The load driving method according to claim 23, further comprising the step of shaping the standard PWM signal in a trapezoidal waveform, and producing the PWM signal at phase where a rising period and a falling period of the waveform do not overlap with each other.

37. The load driving method according to claim 24, further comprising the step of shaping the standard PWM signal in a trapezoidal waveform, and producing the PWM signal at phase where a rising period and a falling period of the waveform do not overlap with each other.

38. The load driving method according to claim 28, further comprising the step of shaping the standard PWM signal in a trapezoidal waveform, and producing the PWM signal at phase where a rising period and a falling period of the waveform do not overlap with each other.

* * * * *